United States Patent
Piramanayagam et al.

(10) Patent No.: US 10,123,018 B2
(45) Date of Patent: Nov. 6, 2018

(54) FEATURE BASED BITRATE ALLOCATION IN NON-BACKWARD COMPATIBLE MULTI-LAYER CODEC VIA MACHINE LEARNING

(71) Applicant: Dolby Laboratories Licensing Corporation, San Francisco, CA (US)

(72) Inventors: Sankaranarayanan Piramanayagam, Rochester, NY (US); Hsuan-Ting Chou, New Taipei (TW); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 227 days.

(21) Appl. No.: 15/270,135

(22) Filed: Sep. 20, 2016

(65) Prior Publication Data

US 2017/0094279 A1 Mar. 30, 2017

Related U.S. Application Data

(60) Provisional application No. 62/234,513, filed on Sep. 29, 2015.

(30) Foreign Application Priority Data

Nov. 20, 2015 (EP) ................................. 15195528

(51) Int. Cl.
*H04N 19/136* (2014.01)
*H04N 19/146* (2014.01)
(Continued)

(52) U.S. Cl.
CPC ......... *H04N 19/136* (2014.11); *H04N 19/115* (2014.11); *H04N 19/146* (2014.11);
(Continued)

(58) Field of Classification Search
CPC ............. G09G 2350/00; H04N 19/115; H04N 19/136; H04N 19/146; H04N 19/154;
(Continued)

(56) References Cited

U.S. PATENT DOCUMENTS 6,233,356 B1   5/2001   Haskell
6,501,797 B1   12/2002  van der Schaar
(Continued)

FOREIGN PATENT DOCUMENTS

EP   1176832   1/2002
EP   2887672   6/2015
(Continued)

OTHER PUBLICATIONS

Zhang, Y. et al "Machine Learning-Based Coding Unit Depth Decisions for Flexible Complexity Allocation in High Efficiency Video Coding" IEEE Transactions on Image Processing, vol. 24, No. 7, Jul. 2015, pp. 2225-2238.
(Continued)

*Primary Examiner* — Francis G Geroleo

(57) ABSTRACT

Novel methods and systems for non-backward compatible video encoding are disclosed. The bitrates of the base layer and enhancement layer are dynamically assigned based on features found in scenes in the video compared to a machine learned quality classifier.

10 Claims, 9 Drawing Sheets

(51) Int. Cl.
*H04N 19/34* (2014.01)
*H04N 19/179* (2014.01)
*H04N 19/30* (2014.01)
*H04N 19/115* (2014.01)
*H04N 19/186* (2014.01)
*H04N 19/154* (2014.01)
*H04N 19/187* (2014.01)

(52) U.S. Cl.
CPC ......... *H04N 19/154* (2014.11); *H04N 19/179* (2014.11); *H04N 19/186* (2014.11); *H04N 19/187* (2014.11); *H04N 19/30* (2014.11); *H04N 19/34* (2014.11); *G09G 2350/00* (2013.01)

(58) Field of Classification Search
CPC .. H04N 19/179; H04N 19/186; H04N 19/187; H04N 19/30; H04N 19/34
See application file for complete search history.

(56) References Cited

U.S. PATENT DOCUMENTS

| | | | |
|---|---|---|---|
| 6,993,201 | B1 | 1/2006 | Haskell |
| 7,933,456 | B2 | 4/2011 | Han |
| 8,848,802 | B2 | 9/2014 | Chaudhury |
| 8,908,758 | B2 | 12/2014 | Leontaris |
| 2004/0101045 | A1 | 5/2004 | Yu |
| 2005/0249240 | A1 | 11/2005 | Boyce |
| 2006/0165302 | A1* | 7/2006 | Han ............... H04N 19/513 382/240 |
| 2006/0222078 | A1 | 10/2006 | Raveendran |
| 2012/0170646 | A1* | 7/2012 | Baylon ............ H04N 19/619 375/240.02 |
| 2013/0208809 | A1* | 8/2013 | Lu ............... H04N 19/30 375/240.26 |
| 2014/0247869 | A1 | 9/2014 | Su et al. |
| 2016/0014420 | A1* | 1/2016 | Su ............... H04N 19/30 375/240.08 |
| 2017/0251211 | A1* | 8/2017 | Froehlich ......... H04N 19/124 |

FOREIGN PATENT DOCUMENTS

| | | |
|---|---|---|
| JP | H04-213172 | 8/1992 |
| WO | 2014/130343 | 8/2014 |
| WO | 2014/160705 | 10/2014 |
| WO | 2016/153896 | 9/2016 |

OTHER PUBLICATIONS

Majumder, A. et al. "Display Gamut Reshaping for Color Emulation and Balancing" IEEE Computer Society Conference on Computer Vision and Pattern Recognition Workshops, Jun. 13, 2010, pp. 17-24.

Boser, B.E. et al "A Training Algorithm for Optimal Margin Classifiers" in Proceedings of the Fifth Annual Workshop on Computational Learning Theory, pp. 144-152, ACM Press, 1992.

Xiu, X et al "Adaptive Color Transform for Different Luma and Chroma Bit-Depth" Oct. 17-24, 2014, Collaborative Team on Video Coding of ISO/IEC JTC1/SC29/WG11 and ITU-T SG 16.

Wu, Jiunn-Lin et al "An Efficient Method for Enhancing High-Contrast Digital Photos Automatically" Jun. 1, 2006, pp. 502-506.

Pytlarz, J. et al "Overview of IPT-PQ Color Space" MPEG Meeting, Oct. 19-23, 2015, Motion Picture Expert Group or ISO/IEC JTC1/SC29/WG11.

* cited by examiner

FEATURE BASED BITRATE ALLOCATION IN NON-BACKWARD COMPATIBLE MULTI-LAYER CODEC VIA MACHINE LEARNING

CROSS-REFERENCE TO RELATED APPLICATION(S)

This application claims priority to U.S. Provisional Patent Application No. 62/234,513, filed Sep. 29, 2015, and European Patent Application No. 15195528.3, filed Nov. 20, 2015, both of which are hereby incorporated by reference in their entirety.

TECHNICAL FIELD

The present disclosure relates to methods for determining the bitrates for the base layer and the enhancement layer for a non-backward compatible dual or multi-layer codec video system. Specifically it relates to using machine learning to determine bitrates that better preserve highlight areas.

BACKGROUND

Display technologies being developed by Dolby Laboratories, Inc., and others, are able to reproduce images having high dynamic range (HDR). Such displays can reproduce images that more faithfully represent real-world scenes than conventional displays characterized by approximately three orders of magnitude of dynamic range (e.g., standard dynamic range—"SDR").

Dynamic range (DR) is a range of intensity (e.g., luminance, luma) in an image, e.g., from darkest darks (blacks) to brightest brights (highlights). As used herein, the term 'dynamic range' (DR) may relate to a capability of the human visual (or psychovisual) system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g., interchangeably.

As used herein, the term high dynamic range (HDR) relates to a DR breadth that spans the some 14-15 orders of magnitude of the HVS. For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those people whose HVS has a time period in which to reset and adjust.

In contrast, the DR over which a human may simultaneously perceive an extensive breadth in intensity range may be somewhat truncated, in relation to HDR. As used herein, the terms 'enhanced dynamic range' (EDR), 'visual dynamic range,' or 'variable dynamic range' (VDR) may individually or interchangeably relate to the DR that is simultaneously perceivable by a HVS. As used herein, EDR may relate to a DR that spans 5-6 orders of magnitude. In the present application, VDR and EDR are intended to indicate any extended dynamic range which is wider than SDR and narrower or equal to HDR.

To support backwards compatibility with existing 8-bit video codecs, such as those described in the ISO/IEC MPEG-2 and MPEG-4 specifications, as well as new HDR display technologies, multiple layers may be used to deliver HDR video data from an upstream device to downstream devices. In one approach, generating an 8-bit base layer version from the captured HDR version may involve applying a global tone mapping operator (TMO) to intensity (e.g., luminance, luma) related pixel values in the HDR content with higher bit depth (e.g., 12 or more bits per color component). In another approach, the 8-bit base layer may be created using an adaptive linear or non-linear quantizer. Given a BL stream, a decoder may apply an inverse TMO or a base layer-to-EDR predictor to derive an approximated EDR stream. To enhance the quality of this approximated EDR stream, one or more enhancement layers may carry residuals representing the difference between the original HDR content and its EDR approximation, as it will be recreated by a decoder using only the base layer.

For the non-backwards compatible (NBC) video codec, input high dynamic range video is partitioned into two or more layers, a base layer (BL) and one or more enhancement layers (ELs), via layer decomposition, which are subsequently compressed for transmission. As used herein, the term "non-backwards compatible video codec" denotes a layered codec wherein the base layer on its own is not adequate to create a usable version of the input signal. That is, a decoder always needs both the BL and the EL layers to fully reconstruct the video signal.

See FIG. 1 for an example NBC encoder system. With multi-layer transmission, there arises an issue as to how to allocate a bit rate to each of the BL and EL layers for the NBC encoder in a way that achieves the best subjective quality subject to total maximum allowed bit rate. In other words, given a fixed transmission bit rate, how much of the bandwidth should be given to the BL and how much to the EL in order to produce the best output video after decoding? Different bit rate distributions (ratios) can produce noticeable differences in the final reconstructed video quality, depending on the features of the input video and on how the layer decomposition is performed in the encoder.

Traditional methods include conducting the rate-distortion analysis in each layer and deriving the optimal solution in terms of mean-squared-error (MSE) or peak signal-to-noise ratio (PSNR). However, these methods have their drawbacks. For example, PSNR does not always correlate to the intended location of visual attention in a scene. A straightforward way to increase the PSNR is to assign more bits to dark areas since more codewords are allocated to dark areas; however, there can be some important brightly lit areas that should also get more bits for better quality. Setting an objective cost function would not achieve better visual quality in this case.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY

Since it is known that there are certain features the human visual system (HVS) pays more attention to, those features can be detected in the video stream. Once it is determined which layer (BL or EL) those features are predominantly located in, more bits can be assigned to the corresponding layer to achieve increased quality. A machine learning method can be used to determine which bit rate combination to use when certain feature sets are detected.

According to a first aspect, a method of assigning bitrates to base layers and enhancement layers in a multi-layer codec is described, the method comprising: scanning a scene of a video for bright and dark areas; decomposing the scene into a base layer and at least one enhancement layer; rescanning the scene extracting feature values of one or more features; determining a bitrate class of the base layer and the at least one enhancement layer by comparing the one or more features to a machine learning model; and setting the bitrates of the base layer and the at least one enhancement layer based on the bitrate class.

The bitrate class may be a bitrate class for all of the base layer and the at least one enhancement layer, e.g., a single bitrate class may be determined for the base layer and the at least one enhancement layer. The bitrate of the base layer and the bitrate(s) of the at least one enhancement layer may sum up to a predetermined bitrate, e.g., total available bitrate.

The method may further comprise generating a base layer bitstream and at least one enhancement layer bitstream in accordance with the set bitrates of the base layer and the at least one enhancement layer, respectively. Generating the base layer bitstream may involve compressing the base layer in accordance with the set bitrate of the base layer. Likewise, generating the at least one enhancement layer bitstream may involve compressing the at least one enhancement layer in accordance with the set bitrate(s) of the at least one enhancement layer, respectively.

According to a second aspect, a method of assigning bitrates to base layers and enhancement layers in a dual codec is described, the method comprising: scanning a scene of a video for bright and dark areas while accumulating feature data of the scene; decomposing the scene into a base layer and at least one enhancement layer; determine a bitrate class of the base layer and the at least one enhancement layer by processing (feature values of) the one or more features against a machine learning model, e.g., comparing the one or more features to the machine learning model; and setting the bitrates of the base layer and the at least one enhancement layer based on the bitrate class. The method may further comprise determining feature values of the one or more features of the scene using the accumulated feature data of the scene. The method may further comprise calculating an alpha value based on the bright and dark areas, wherein the alpha value is the exponent of a formula for forward reshaping of a luminance channel of the video. Said decomposing may involve determining the base layer and the at least one enhancement layer of the video based on the alpha value (e.g., based on the formula in which the alpha value is the exponent). For example, determining the base layer and the at least one enhancement layer of the video may be performed by clipping at a mid-range (or more generally, a separation value) of the forward reshaped luminance channel. The mid-range value (or more generally, a separation value) may be determined based on the alpha value (e.g., based on the formula in which the alpha value is the exponent).

The bitrate class may be a bitrate class for all of the base layer and the at least one enhancement layer, e.g., a single bitrate class may be determined for the base layer and the at least one enhancement layer. The bitrate of the base layer and the bitrate(s) of the at least one enhancement layer may sum up to a predetermined bitrate, e.g., total available bitrate.

The method may further comprise generating a base layer bitstream and at least one enhancement layer bitstream in accordance with the set bitrates of the base layer and the at least one enhancement layers, respectively. Generating the base layer bitstream may involve compressing the base layer in accordance with the set bitrate of the base layer. Likewise, generating the at least one enhancement layer bitstream may involve compressing the at least one enhancement layer in accordance with the set bitrate(s) of the at least one enhancement layer, respectively.

According to a third aspect, a non-backward compatible encoder is described comprising: a layer decomposition and bitrate assignment module; a base layer compression module; an enhancement layer compression module; a base layer bitrate information path between the layer decomposition module and the base layer compression module; and an enhancement layer bitrate information path between the layer decomposition module and the enhancement layer compression module.

According to a fourth aspect, a method for building a classifier for a system utilizing dual codec bitrate assignment is described, the method comprising: select a plurality of bitrate classes for the system; provide a plurality of scenes; for each scene of the plurality of scenes: compress and reconstruct the scene into a base layer and an enhancement layer at different bitrates (e.g., at different bitrates, compress the scene into a base layer and an enhancement layer, and reconstruct the scene from the base layer and the enhancement layer); determine a bitrate class that has the highest visual quality (e.g., determine a bitrate class that has the highest visual quality among the selected plurality of bitrate classes); and extract values of one or more features of the scene; determine hyperplanes for the values that separate feature values into the plurality of bitrate classes (e.g., determine hyperplanes in an N dimensional space for the feature values that separate the feature values into the plurality of bitrate classes, where N is the number of the one or more features of the scene). Compressing the scene may involve decomposing the scene into the base layer and the enhancement layer and compressing the base layer and the enhancement layer, at respective bitrates. Decomposing the scene may be performed as described with reference to the first and second aspects. Said selection may be from predetermined bitrate classes. The different bitrates for compression of the scene into the base layer and the enhancement layer may be determined by respective bitrate classes among the selected plurality of bitrate classes. Each bitrate class may determine both the bitrate for base layer and the bitrate for the enhancement layer. The various bitrates are the same as the bitrate classes. The respective bitrate classes of the respective feature values separated in the N dimensional space may be the bitrate classes that have the highest visual quality.

The method may further comprise outputting the classifier for use in a method of assigning bitrates to base layers and enhancement layers in a dual codec.

DETAILED DESCRIPTION

Figure 1:
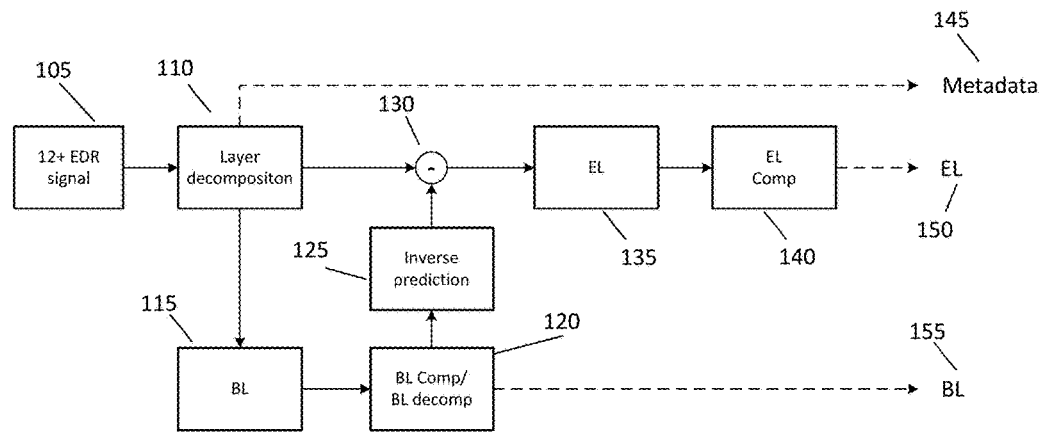
FIG. 1 illustrates an example prior art NBC encoder.

The NBC codec input video can, in an embodiment without limitation, be performed in the IPTPQ color space, with I, P and T channels sampled at, for example, 4:4:4, 4:2:0 or 4:2:0 ratios. The IPTPQ space, as described in PCT Application Ser. No. PCT/US2014/016304, filed on Feb. 13, 2014, titled "Display Management for High Dynamic Range Video," and published as WO 2014/130343, which is incorporated herein by reference in its entirety, combines the IPT color space with a perceptual quantizer. In the IPTPQ space, the dark regions tend to be assigned more code words compared to the highlight regions. A power function can be used to reshape the input video signal in the layer decomposition module which conducts forward reshaping and decomposition high bit depth data into two low bit depth data. Examples of reshaping functions can be found in PCT Publication Ser. No. WO2014/160705A1, titled "Encoding Perceptually-Quantized Video Content in Multi-Layer VDR Coding" by Guan-Ming Su et al., or in U.S. Provisional Patent Application Ser. No. 62/199,391, filed on Jul. 31, 2015, and titled "Signal Reshaping Approximation," both of which are incorporated herein by reference in their entirety. Forward reshaping of the luminance channel in the encoder can be given by the following equation:

$$s_i = \text{round}\left((C_H - C_L)\left(\frac{v_i - v_L}{v_H - v_L}\right)^\alpha + C_L\right)$$

Notably, this forward reshaping can be used in general for any luminance channel of video, regardless of whether the NBC codec and/or the IPTPQ color space is used. The same holds true for the features and method steps described in the remainder of this disclosure, unless indicated otherwise.

Here, $v_L$ and $v_H$ are the minimum and maximum luminance values in an individual shot of the video (e.g., in an individual shot of the scene of the video). $C_L$ and $C_H$ are the minimum and maximum values of the reshaped output signal. The alpha ($\alpha$) value can be adaptively selected based on the presence of bright and dark areas in the video. An alpha value of 1.4 can, for example, be chosen for shots with objects in mid-tone, value of 1 for shots with a large dark area, and a value of 1.7 for shots with predominantly smooth, bright regions. More complex algorithms can produce other values for alpha. Setting $C_L$ and $C_H$ to 0 and 511 respectively clips the reshaped I signal at 255 to form BL∈[0, 255] and EL∈[0, 255].

The obtained base layer (BL) and enhancement layer (EL) images can be processed independently of each other in the encoder. At the decoder, the BL and EL images are reconstructed from the bit stream and merged together for display. In one embodiment, the EL image can be generated by subtracting a predicted EDR image (generated from the BL image) from the original image.

The content provider may allocate a bandwidth ($R_T$) within a video segment (for example, a segment of 3 to 10 seconds in length) for a video streaming service. This total bitrate ($R_T$) can then be divided into a BL bitrate ($R_{BL}$) and an EL bitrate ($R_{EL}$) for each video segment.

Figure 2:
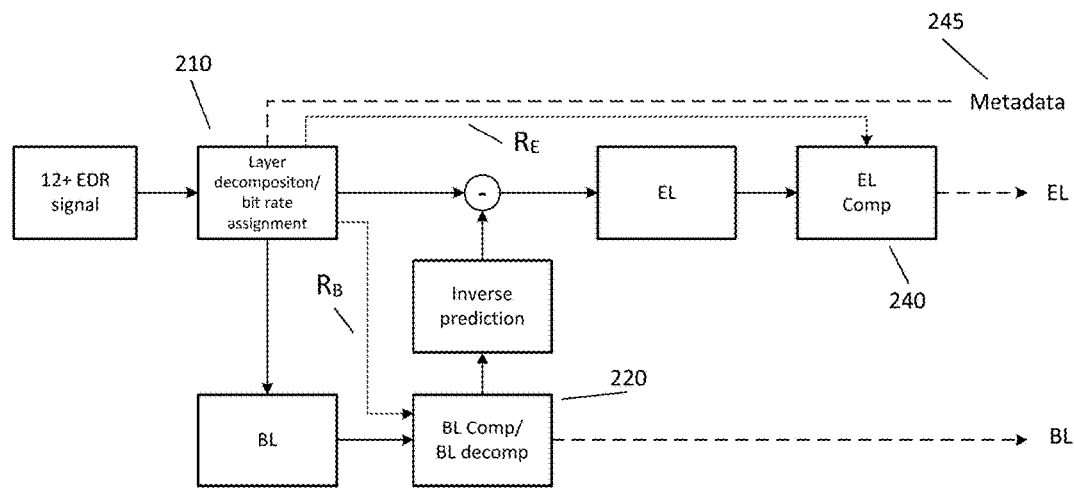
FIG. 2 illustrates an example NBC encoder modified for BL/EL bitrate allocation.

In one embodiment, the dynamic bit rate assignment can happen during the layer decomposition phase. The BL compression module needs to know the assigned bit rate for BL and the EL compression module needs to know the assigned bit rate for EL. However, the EL generation depends on the reconstructed BL. Therefore, there is a dependency between BL and EL. Once the bit rate in BL is determined, the bit rate in EL is also determined. In other words, the bit rate allocation should sit inside the layer decomposition module, prior to BL and EL compression. An example of this architecture is shown in FIG. 2.

Figures 3A, 3B:
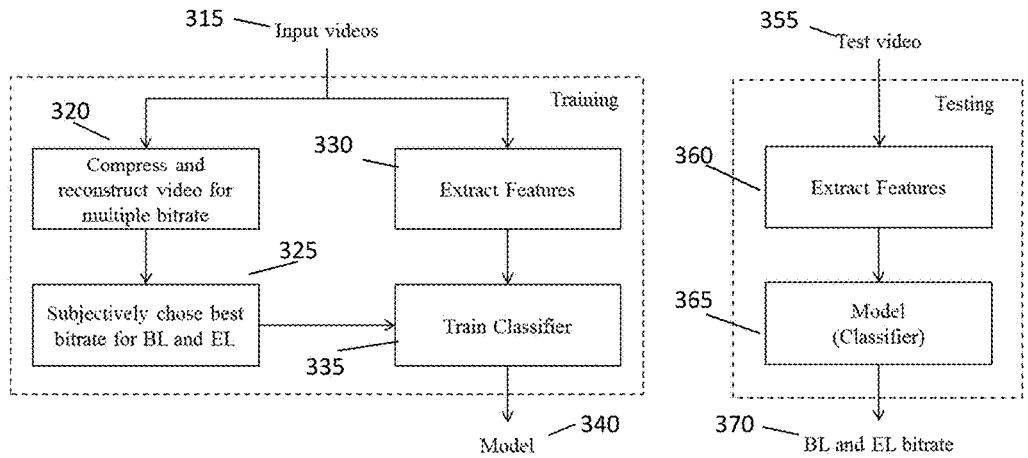
FIGS. 3A and 3B illustrate an example flowchart for training and corresponding BL/EL bitrate determination of a test video.

A supervised classification approach to assign bitrates to the BL and EL can be used. In a supervised method, sample videos and corresponding known classes are first utilized to learn the model (i.e., train a classifier). Then, a new video sample can be categorized into a class by use of the model. FIGS. 3A and 3B show the overview of the algorithm. For example, a set of videos with diverse content can be selected and passed through the encoding-decoding process at various BL-EL bitrates (i.e., classes). The compressed videos at different bitrates are viewed to determine the BL and EL bitrates that produce the best visual quality to an HVS. Robust features extracted from the video and its corresponding bitrate label can be utilized to generate a model. Similar features found in the new video are passed through the classifier to find the BL-EL bitrate class. The number of BL-EL bitrates (classes) can be fixed and known beforehand.

I. Intuitive Architecture: Two Pass Method

The alpha value can be determined after statistics are collected for each frame within a scene. In other words, the layer decomposition happens when all frames are scanned within a scene and how to partition each frame into two layers via the selected alpha value can then be determined. Having the partition, the BL is obtained. The BL goes through the compression module to produce the BL bitstream. The EL is generated by taking the difference between the predicted decompressed BL and original video input.

A two-pass approach can be done by scanning all frames within a scene first to find bright and dark blocks and thereby compute the alpha value. The found alpha value enables the mapping of the luminance in high dynamic range video to a lower dynamic range. BL and EL content can then be obtained by clipping at a mid-value in the lower bit depth. Now that the alpha and cut-off point are known, the BL and EL pixels in each frame of the video can be analyzed separately. In the second pass, features can be generated from the exact BL and EL pixels. Some of the features found include, but are not limited to, pixel count and standard deviation in each of the I, P and T channels. The benefit of this method is that the feature values calculated are highly accurate. However, this kind of encoding architecture requires two passes, which is time consuming. In general, a one pass method might be preferred.

II. One Pass Method: Feature-Bin Approach

The main difficulty for one pass method is that the alpha value is only determined after the entire scene has been scanned. After having the alpha value, it is then known which areas belong to BL and which areas belong to EL. Once that is known, the features in each layer can be calculated.

Figure 4:
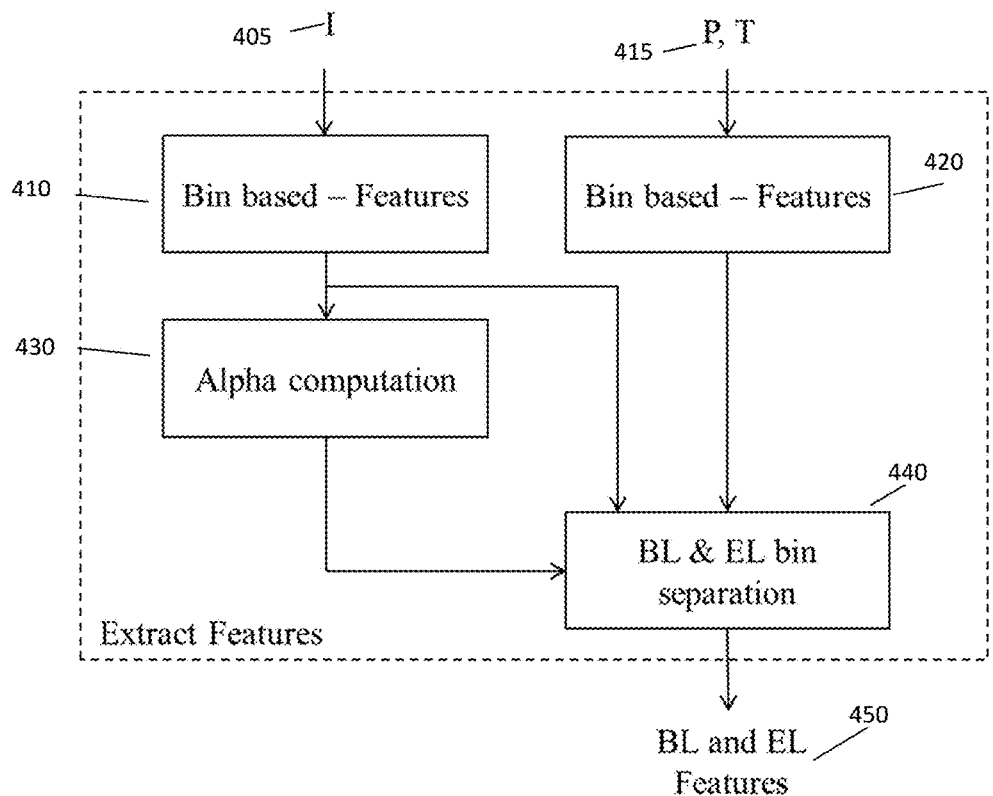
FIG. 4 illustrates an example flowchart for feature extraction for I, P, and T channels.

For the single pass method, the features are computed from the original video (high dynamic range images) employing a bin-based accumulator, where bins are partitioned according to the luminance range, and where features are also calculated via a bin-based method. Once the alpha is computed, BL and EL features are derived from the accumulators. The advantage of single pass method is that the video is parsed only once and the features being computed are used in both alpha computation and bitrate allocation. Even though a feature found by this method slightly deviates from the two pass method, it does not affect the bitrate allocation step. An example of the bin-based method is shown in FIG. 4.

III. Basic Feature-Bin Concept

Assume, the original I, P, and T channels of the video have a bit depth of B bits (e.g., 16-bit) and the video is composed of $N_{shot}$ shots. Let $I_{ji}$ be the intensity value at pixel location i in frame j and have values between 0 and $2^B-1$. For each image of the video, a histogram and block based standard deviation are found.

Let $N_{bin}$ be the number of quantization bins. Each bin ($\omega_k$) contains the pixel indices whose value falls between quantized intensity values. Let $h_{j,k}$ count the number of pixels in each bin and essentially be the histogram of an image with $N_{bin}$ bins.

$$\omega_{j,k} = \left\{ i \,\middle|\, (k-1)*\left(\frac{2^B}{N_{bin}}\right) <= I_{ji} < k*\left(\frac{2^B}{N_{bin}}\right) \right\} \quad k=1, 2 \ldots, N_{bin}$$

The standard deviation is found on non-overlapping image blocks (e.g., 16×16) of the image. Let n be the block index in the frame j. For each block of the image, mean $M_{jn}$ and standard deviation $S_{jn}$ of individual channels (I, P, and T) are found. Then, $\rho_{j,k}$ contains the block indices whose mean value falls between quantized intensity values.

$$\rho_{j,k} = \left\{ n \,\middle|\, (k-1)*\left(\frac{2^B}{N_{bin}}\right) <= M_{jn} < k*\left(\frac{2^B}{N_{bin}}\right) \right\}$$
$$k = 1, 2 \ldots, N_{bin}$$
$$SQ_{j,k} = \sum_{n \in \rho_{j,k}} S_{jn} \quad k=1, 2 \ldots, N_{bin}$$

The standard deviations of the blocks which fall in the same bin are summed to form quantized standard deviation $SQ_{j,k}$. Thus, for each image of the video, histogram $h_{j,k}$ and standard deviation $SQ_{j,k}$ are found.

Once the alpha value is computed for each shot of the video, the power reshaping function and the input luminance value where BL and EL are separated is known. That is, the input luminance value may be said to be determined based on the alpha value. The bin in each scene c ($bin\_sep_c$) corresponding to this luminance value marks the separation between BL and EL features. The HDR domain I image (e.g., 16-bit) is split to BL (e.g., 8-bit) and EL image (e.g., 8-bit). The bin_sep can be found by calculating the value in the backward reshaping function.

$$v = (v_H - v_L)\left(\frac{s - C_L}{C_H - C_L}\right)^{1/\alpha} + v_L$$

The $bin\_sep_c$ can be calculated by substituting $C_L=0$, $C_H=511$, $s=255$; setting B to the bit size of the signal (e.g., 16 for 16-bit TIFF or 12 for 12-bit HD-SDI); using the known values $v_H$, $v_L$, and alpha to determine v; and quantizing the solution, for example with a floor function:

$$bin\_sep_c = \left\lfloor v \,\middle/\, \frac{2^B}{N_{bin}} \right\rfloor$$

Note that the $bin\_sep_c$ will be different from one scene to another scene since $v_H$, $v_L$, and alpha changes scene by scene.

The pixels in the 8-bit images will have corresponding pixel in the 16-bit image. In the one pass algorithm, BL and EL features are found from the HDR domain.

$$BL_{pxl\_cnt} = \sum_{c=1}^{N_{shot}} \left[ \sum_j \left( \sum_{k=1}^{bin\_sep_c - 1} h_{j,k} \right) \right]$$

$$EL_{pxl\_cnt} = \sum_{c=1}^{N_{shot}} \left[ \sum_j \left( \sum_{k=bin\_sep_c}^{N_{bin}} h_{j,k} \right) \right]$$

$$BL_{std} = \sum_{c=1}^{N_{shot}} \left[ \sum_j \left( \sum_{k=1}^{bin\_sep_c - 1} SQ_{j,k} \right) \right]$$

$$EL_{std} = \sum_{c=1}^{N_{shot}} \left[ \sum_j \left( \sum_{k=bin\_sep_c}^{N_{bin}} SQ_{j,k} \right) \right]$$

Figure 5:
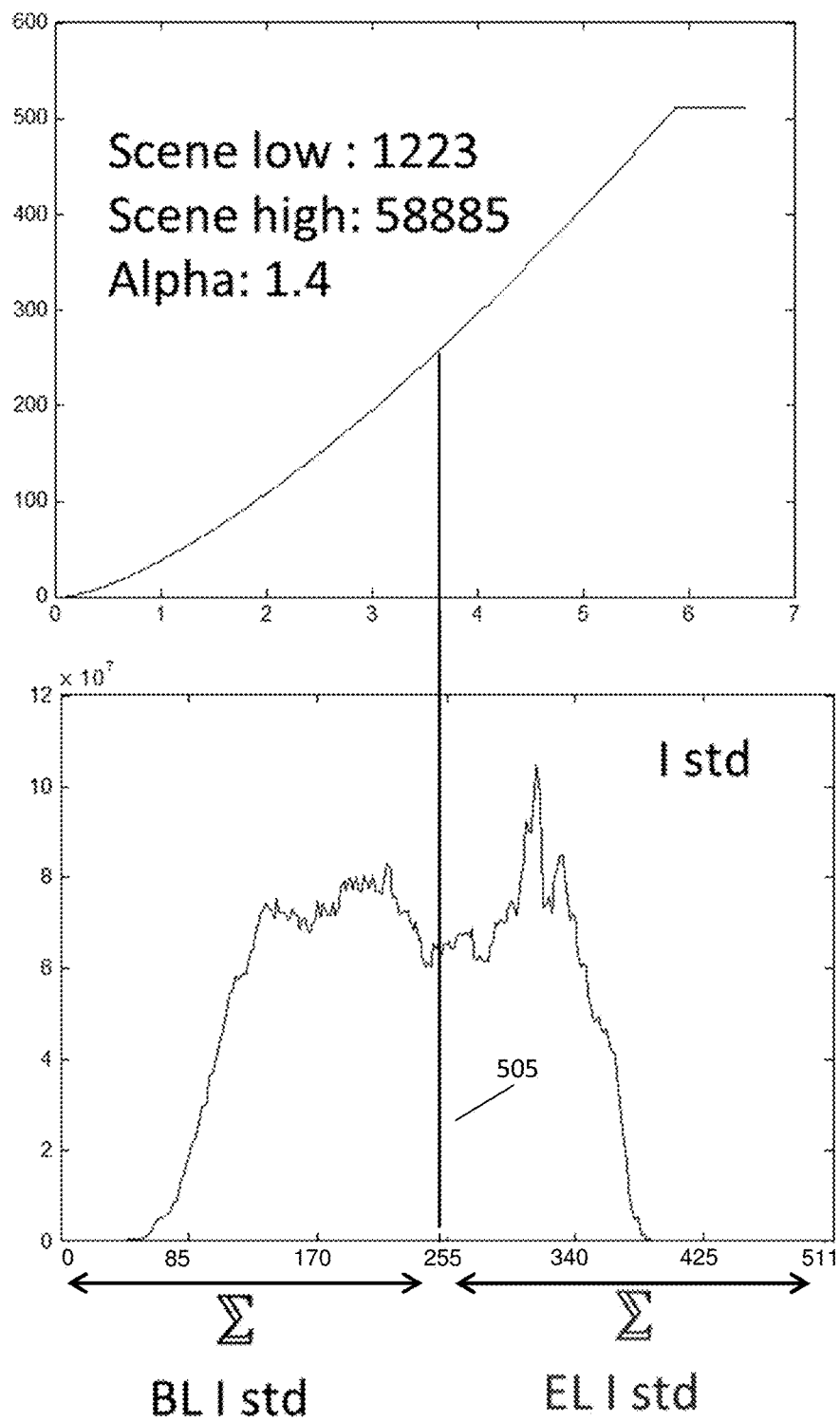
FIG. 5 illustrates an example graphs depicting BL/EL separation calculation based on standard deviation in the I channel.

In the NBC codec, only the I channel is partitioned into BL and EL whereas the P and T channels are encoded as a single layer. In order to generate additional features for bit rate allocation, it can be assumed that the P and T channels have same BL and EL pixels as the I channel in the 444 format. In the 420 format, where P and T channel are subsampled by 2 in the x and y spatial directions, the block size to compute the mean and standard deviation is reduced by half in each direction. This enables computing $BL_{std}$ and $EL_{std}$ for P and T channels. The graphs for a standard deviation calculation are shown in FIG. 5.

IV. Generic Feature-Bin Framework

The above mentioned feature-bin method can be generalized. Given a desired feature detector, for example a detector that finds faces and fire within scenes, the salient regions can be detected for use in the bin-based method.

Similar to features discussed before, bins can be constructed to calculate the saliency response in different luminance ranges.

IV.A. Pixel Based

For a pixel based feature, a salient feature map can be constructed for the $i^{th}$ pixel at $j^{th}$ frame as $F_{ji}$. The value of $F_{ji}$ can be a binary value or real value. Then the following bins are provided:

$$\theta_{j,k} = \left\{ i \,\middle|\, (k-1) * \left(\frac{2^B}{N_{bin}}\right) <= I_{ji} < k * \left(\frac{2^B}{N_{bin}}\right) \right\} \quad k = 1, 2 \ldots, N_{bin}$$

$$SF_{j,k} = \sum_{i \in \theta_{j,k}} F_{ji} \quad k = 1, 2 \ldots, N_{bin}$$

The basic idea is to collect the pixels whose value fall into bin k, and then sum up the feature value for those pixels, thereby constructing the feature bin.

IV.B. Block Based

For a block based feature, let n be the block index in the frame j. For each block of the image, calculate the mean $M_{jn}$ and block-based feature $F_{jn}$. The following bins are provided:

$$\rho_{j,k} = \left\{ n \,\middle|\, (k-1) * \left(\frac{2^B}{N_{bin}}\right) <= M_{jn} < k * \left(\frac{2^B}{N_{bin}}\right) \right\}$$

$$k = 1, 2 \ldots, N_{bin}$$

$$SF_{j,k} = \sum_{n \in \rho_{j,k}} F_{jn} \quad k = 1, 2 \ldots, N_{bin}$$

Then collect those bins for each frame within a scene. After determining the alpha value, the partition value is known and, thus, which bin partitions the BL and EL. Then, calculate the features in BL and features in EL.

$$BL_{feature} = \sum_{c=1}^{N_{shot}} \left( \sum_{j} \left( \sum_{k=1}^{bin\_sep_c - 1} SF_{j,k} \right) \right)$$

$$EL_{feature} = \sum_{c=1}^{N_{shot}} \left( \sum_{j} \left( \sum_{k=bin\_sep_c}^{N_{bin}} SF_{j,k} \right) \right)$$

To remove the resolution dependency in the feature, take the ratio between the feature in EL and BL. This can be done in a number of ways. For example:

$$\frac{EL_{feature}}{BL_{feature}} \text{ or } \frac{EL_{feature}}{BL_{feature} + EL_{feature}}$$

V. Example

Figure 6:
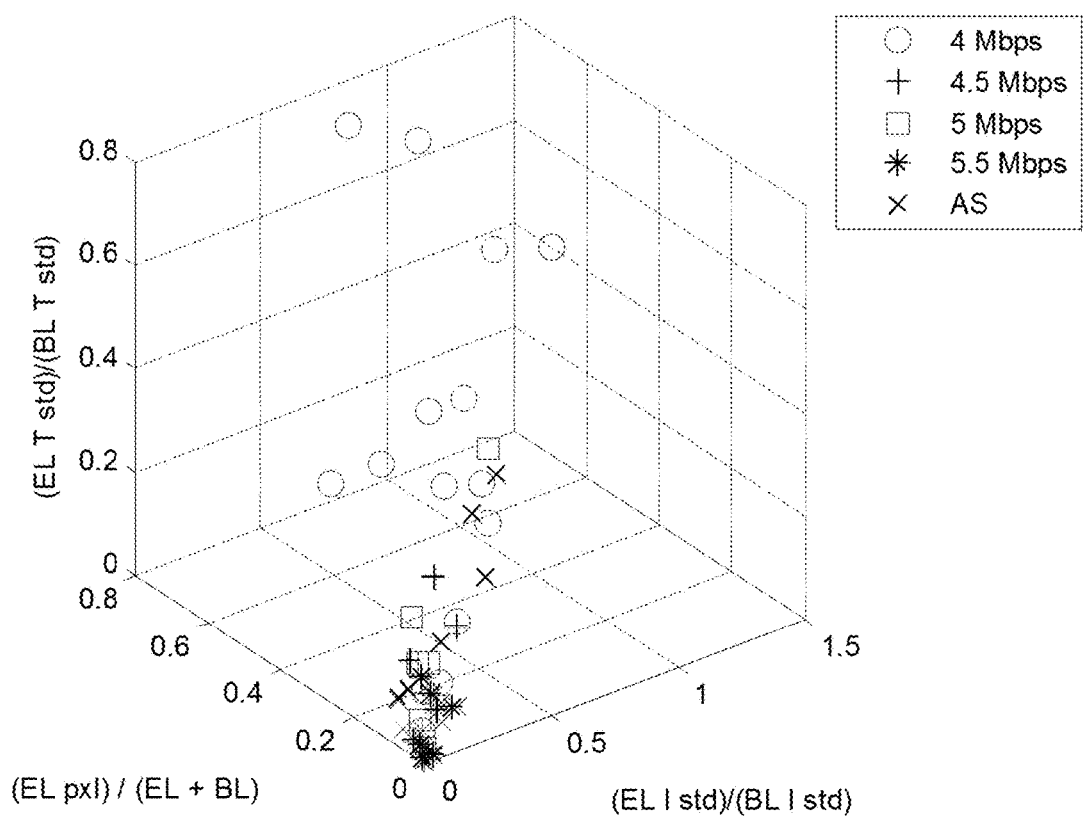
FIG. 6 illustrates an example graph of video training for three features.

A supervised classification approach is utilized for the bit rate allocation. Initially, a set of 49 videos is chosen and encoding-decoding process is performed for multiple BL and EL bitrates with total bitrate fixed at 6 Mbps. The BL bitrates selected are 4 Mbps, 4.5 Mbps, 5 Mbps and 5.5 Mbps (67%, 75%, 83% and 91% of the total bitrate). The videos are viewed in a display to a human judge and the bit rate that gave best visual quality, according to the judge, is considered as the optimal value. FIG. 6 shows a plot of features with labeling of the points indicating the best bitrate for each video. In some cases, no visual differences are found between any of the bitrates, and hence are termed "all same" (AS). The AS videos can be removed for training the classifier, as they are not useful for distinguishing the best bitrate.

VI. Features

Features selected for bitrate allocation should be able to handle a change in video resolution and should include subjective importance of content. In addition, the features should be computed in real time. Example features are follows

- (EL number of pixels)/(BL number of pixels+EL number of pixels)
- (EL I standard deviation)/(BL I standard deviation)
- (EL T standard deviation)/(BL T standard deviation)
- (EL P standard deviation)/(BL P standard deviation)
- Alpha
- Advanced features, such as salient regions (ex. fire and faces).

Here, the BL and EL features are calculated in the high dynamic range (HDR) domain. In the one pass algorithm, these values might not exactly match the BL and EL features found in BL and EL for 8-bit images. But they are a good approximation and works well for the bitrate allocation classification.

Herein "salient regions" refer to regions on an image or in a scene that would draw attention to a viewer, or are intended to draw attention to a viewer, in the HVS domain (such as faces), or that present encoding/decoding artifact issues due to their brightness (such as shadow or highlight).

Having a high ratio of pixels in the EL means that a higher bitrate should be used in EL; therefore, the EL pixel percentage can be used as a feature, either as a comparison to the BL or as a comparison to the total (BL+EL) pixel count. The standard deviation can be chosen as a second feature as it captures the variation within the block of an image. A higher or lower value of the EL/BL ratio would signify higher or lower bitrate for enhancement layer. The computation of feature values can be performed by the single pass or the two pass method described above.

For a system with multiple ELs, the computation becomes multi-dimensional with the ratios of the pixel counts of each layer compared to the next layer down is considered. For example, for a two EL system, ratio of the pixel counts of the secondary EL to the primary EL is calculated and the ratio of the pixel counts of the primary EL to the BL is calculated. Taken together as joint features, the ratios can be used to determine which EL2:EL1:BL bitrate has the highest quality for training and which EL2:EL1:BL classification should be applied in encoding.

The first three features listed above perform especially well in distinguishing between the various bitrates. Other salient features also represent which parts of the picture are important to HVS. If the important visual attention part is located at one layer, it could be useful to assign more bits in that layer.

VII. Classifier

Now that the feature and corresponding best bitrates are available, a model that separates different classes (bitrates) in the feature space can be generated. A linear support vector machine method (SVM) can be used to find hyper planes in the feature space that optimally partition the different classes. For example, if training provides bitrates of 4, 4.5, 5, and 5.5 Mbps (for the EL), but 4.5 Mbps and 5 Mbps are of one class and are assigned the bitrate 4.75 Mbps, then instead of four, there are three bitrates (BL—4 Mbps, 4.75 Mbps and 5.5 Mbps, 67%, 79, and 92%).

Figure 7:
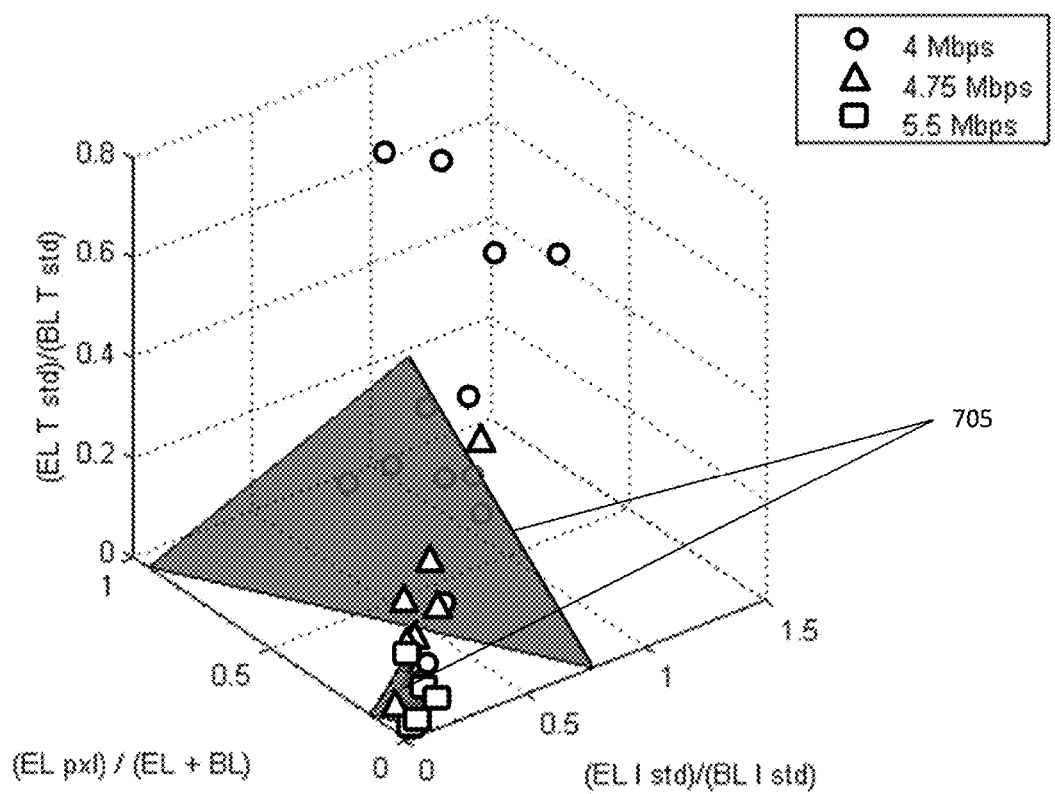
FIG. 7 illustrates an example graph of partitioning/classification for three feature training.

By employing the SVM method, one hyperplane that separates 4 Mbps from the rest and another that separate 5.5 Mbps from rest can be found. FIG. 7 shows the planes found through the linear SVM method. A one-against-all method generates a better boundary than something like "4 Mbps vs 4.75 Mbps & 4.75 Mbps vs 5.5 Mbps".

These plane equations are utilized during the bitrate allocation for any new test video. Features are first calculated from the video. By finding the side of the plane (projection) the feature point falls into, it is classified into a specific bitrate category (e.g., BL—67%, 79% and 92%).

If only a few videos were used for training, the hyperplane that separates 4 Mbps vs rest might not be able to exactly model the given problem. Therefore, the (EL number of pixels)/(BL number of pixels+EL number of pixels) intercept is placed at around 0.9. In that way the intercepts can be manually adjusted for the 4 Mbps vs rest plane. By changing the intercept, the confusion matrix remains unchanged. If large features are used, and if it is not possible to visualize the contribution of features, then methods like principal component analysis can be used.

For N-dimensional feature vector $x=[x_1\ x_2\ \ldots\ x_n]^T$, the SVM algorithm generates a hyperplane utilizing the training data. The equation is given by $$w^T x + b = 0$$

Here $w=[w_1\ w_2\ \ldots\ w_n]^T$. Once a hyperplane that separates two classes are found, it can be used to determine bitrate for new test videos. Consider a test video with features $F=[F_1\ F_2\ \ldots\ F_n]^T$. It is classified to either one of the categories, based on which side of the hyperplane the point falls into.

$$w^T F + b \geq 0 \Rightarrow \text{Class 1}$$

$$w^T F + b < 0 \Rightarrow \text{Class 2}$$

For example, three features and three classes can be used and so the equation of two planes generated from training data is given by: $w_1^1 x_1 + w_2^1 x_2 + w_3^1 x_3 + b^1 = 0$ and $w_1^2 x_1 + w_2^2 x_2 + w_3^2 x_3 + b^2 = 0$ Now, given a new video, three features ($F_1, F_2, F_3$) found are substituted in the plane equations to determine the class or bitrate.

Plane $w_1^1 x_1 + w_2^1 x_2 + w_3^1 x_3 + b^1 = 0$ separates class 1 and class 2 and the plane $w_1^2 x_1 + w_2^2 x_2 + w_3^2 x_3 + b^2 = 0$ separates class 2 and class 3.

$$w_1^1 F_1 + w_2^1 F_2 + w_3^1 F_3 + b^1 \geq 0 \Rightarrow \text{Class 1}$$

$$w_1^2 F_1 + w_2^2 F_2 + w_3^2 F_3 + b^2 \geq 0 \Rightarrow \text{Class 2}$$

$$w_1^2 F_1 + w_2^2 F_2 + w_3^2 F_3 + b^2 < 0 \Rightarrow \text{Class 3}$$

Here,
Feature 1 (Ftr_I_ratio) is (EL I std)/(BL I std)
Feature 2 (Ftr_EL_prct) is (EL pxl count)/(EL+BL)
Feature 3 (Ftr_T_ratio) is (EL T std)/(BL T std)
A code for allocating BL and EL bitrate is given in Table 1 below:

TABLE 1

Example Code for Allocating BL and EL Bitrate (w1v23[n] and w12v3[n] being weights for different bitrates)

```
if( (w1v23[0]*Ftr_I_ratio + w1v23[1]*Ftr_EL_prct + w1v23[2]*
Ftr_T_ratio + w1v23[3]) >= 0 ){
    *BL_bitrate = (int) (total_bitrate*0.6667);
    *EL_bitrate = total_bitrate – (double) *BL_bitrate;
}
```

TABLE 1-continued

Example Code for Allocating BL and EL Bitrate (w1v23[n] and w12v3[n] being weights for different bitrates)

```
else if( (w12vs3[0]*Ftr_I_ratio + w12vs3[1]*Ftr_EL_prct +
w12vs3[2]*Ftr_T_ratio + w12vs3[3]) >= 0){
    *BL_bitrate = (int) (total_bitrate*0.7917);
    *EL_bitrate = total_bitrate – (double) *BL_bitrate;
}
else{
    *BL_bitrate = (int) (total_bitrate*0.9167);
    *EL_bitrate = total_bitrate – (double) *BL_bitrate;
}
```

VIII. Advanced Features

Additionally, it can be useful to take into consideration the visually salient regions of the video. Two examples are faces and fire.

In the first example, the video contains a person's face in a shadowed region. Since the overall image luminance is high, the bitrate allocation will give lower bitrate for the base layer. But the face in the shadow region will look better if the bitrate for BL layer is high.

In the second example, a fire (high luminance) occupies small portion the video image and, therefore, the algorithms based on pixel counts will tend to assign a lower bitrate for enhancement layer. But a higher bitrate for the EL would reduce the video artifacts in the fire.

If the salient regions are found in a layer with few pixels, they are likely to be assigned lower bitrate based on pixel count algorithms. To avoid this scenario, a detector can be used that finds the salient feature. If the important salient regions are found in one layer (BL or EL), that layer can be provided a higher bit rate. These types of salient region features can be combined with the pixel count features.

First, a detector can be used to determine the bins that are likely to contain salient regions. From this, the likelihood of salient region in BL or EL could be determined after the alpha computation. This feature can then be used in conjunction with three or more other features to find a hyperplane that separates the classes. For example, a face detection approach could be employed to find which pixels or bins that contain face regions. If most of the bins found are in a particular layer, then it requires more bitrate allocation. As with other features, the face detection feature can be combined with other features in a weighted or non-weighted manner.

IX. Slope-based Approximation

In the bin-based feature computation, the standard deviation of the BL or EL bins can be summed together. The values obtained can be computed in the 16-bit domain and are an approximation of the corresponding 8-bit BL and EL images. To obtain a more accurate representation of the 8-bit domain BL and EL images, the standard deviation of each bin can be multiplied by the slope of a power function and then summed together. A weighted standard deviation computation is shown below in Table 2. Here, f(x) is the power function, SQ is the bin-based standard deviation computed in 16-bit image and bin_sep is the bin index that separates BL and EL.

TABLE 2

An Example Weighted Standard Deviation Computation (function f'(k) being the first derivative of the function f(k))

```
BL_std = 0;
for k = 1 : 1 : bin_sep – 1
    BL_std = BL_std + f'(k) * SQ(k);
end
```

TABLE 2-continued

An Example Weighted Standard Deviation Computation
(function f'(k) being the first derivative of the function f(k))

```
EL_std = 0;
for k = bin_sep : 1 : 256
    EL_std = EL_std + f'(k) * SQ(k);
end
```

In the one pass method, some blocks can contain both BL and EL pixels. Standard deviations found from these blocks (e.g. 16-bit) are accumulated to either BL or EL standard deviation based on the mean value. Therefore, values might not exactly match the 8-bit BL and EL standard deviation. To save computation, the multiplication of the weights can be ignored: there is only a slight variation from 8-bit values and in general, it does not affect the classification.

For the two pass case, standard deviation (16-bit) found through multiplication of slope will precisely represent the 8-bit BL and EL counterpart.

X. Feature Normalization

The main feature that helps to separate the different bitrates or classes is the EL pixel percentage, i.e., EL pixels over total number of pixels. This feature can be normalized from 0 to 1. When the resolution of the video is changed, it should not affect the outcome very much. In the case of the "EL standard deviation divided by the number of frames used" feature, it was found that this feature is not invariant to the scale of the video and, therefore, would require separate training and decision boundaries for each scale.

XI. Detailed Description of the Drawings

FIG. 1 depicts an example of a NBC dual codec encoder. An input video signal (105), for example a 12+ bit EDR signal, is processed for layer decomposition (110). One output of the layer decomposition (110) is a base layer (115) for compression (120) into the BL output stream (155). The compressed BL is also decompressed (120) for inverse prediction (125). The residual (130) of the inverse predicted BL and the decomposed EDR signal produces the enhancement layer (135), which is compressed (140) into the EL output stream (150). The layer decomposition (110) also produces metadata (145) regarding the BL and EL layers for eventual decoding.

FIG. 2 depicts an example of a modified NBC dual codec encoder, utilizing a dynamic bitrate assignment based on the feature-bin. The layer decomposition includes (or is preceded by) a bitrate assignment (210) for the BL and EL based on a machine learned classification. The EL bitrate value ($R_E$) is passed to the EL compression module (240) and the BL bitrate value ($R_B$) is passed to the BL compression module (220), so the BL and EL are sent at their assigned bitrates. That is, the BL (e.g., BL data) is compressed in accordance with the bitrate assigned to the BL, thereby generating a BL bitstream, and the EL (e.g., EL data) is compressed in accordance with the bitrate assigned to the EL, thereby generating an EL bitstream. The bitrate information can also be included in the metadata (245) for the decoder.

FIG. 3A depicts a method of training to produce a model/classifier (340) for bitrate assignment. A series of sample input videos (315) are compressed and reconstructed (320) at various BL-EL bitrate ratios (e.g., at different EL bitrates for a constant total bitrate). The reconstructed videos are viewed, and the bitrate ratio that has the best (subjectively) video quality is determined (325) for each sample input video (315). Each sample input video (315) is also scanned or calculated for various features (330) such as EL pixel count, channel standard deviation, alpha, or salient features. The extracted features (330) and the selected best bitrates (325) are then used to train a classifier (335), thus producing a model (340) that can be used to estimate the best bitrate for future videos.

FIG. 3B depicts a method for using a classification model, such as the one (340) produced in FIG. 3A. The new, or test, video (355) has its features extracted (360) just as they were extracted (335) in the training method (310). The extracted features (360) are then compared to the model (365), which determines the BL and EL bitrates or bitrate class (370) that is expected to most likely produce the best quality video of the available bitrates/bitrate classes.

FIG. 4 depicts a method of feature extraction for IPT channel video. However, this method may also be applied independently of whether or not the video is an IPT channel video, i.e., may be applied also to other channels (e.g., luminance channels). The I channel (405) and the P+T channels (415) have their features detected/calculated separately (410,420). The alpha value is calculated (430) for the I channel and the I channel feature bin, the P+T channel feature bin, and the alpha value are used to produce a power reshaping function and input luminance value (e.g., separation value) that separates (440) the BL and EL features (450). Pixels with luminance values below said input luminance value may be assigned to the base layer, and pixels with luminance values above said input luminance value may be assigned to the enhancement layer. The input luminance value may be a mid-range luminance of the power reshaping function. The alpha value may be calculated on the basis of bright and dark blocks in a scene of the video that are identified by scanning for bright and dark blocks in the scene of the video.

FIG. 5 depicts an example graph where, once the alpha is determined (in this example, 1.4), the partition (505) between BL and EL feature bins can be found (in this example, the feature is the standard deviation in the I channel). The partition is at the s value for the backward reshaping function, shown here for example as 255.

FIG. 6 depicts an example graph of training video data plotting the highest quality, as determined for the HVS, video bitrates for a number of sample videos. The bitrates tested were 4 Mbps, 4.5 Mbps, 5 Mbps, and 5.5 Mbps. Also shown are results where all bitrates were determined to be of equal quality, or "all same" (AS). The features extracted for this example are the T channel standard deviation ratio, the EL pixel count to total pixel count ratio, and the I channel standard deviation ratio. The graph is a three dimensional graph because there are three features being considered, however, any number of features can be used resulting in a graph with N dimensions where N is the number of features being used.

FIG. 7 depicts an example classification and simplification of the data from FIG. 6. The 4.5 Mbps and 5 Mbps data is combined to 4.75 Mbps and the AS values are ignored. Two hyperplanes (705—the shaded planes that resect the cube) are generated that separate the space into three regions, which correspond to three classifiers for the model.

Figure 8:
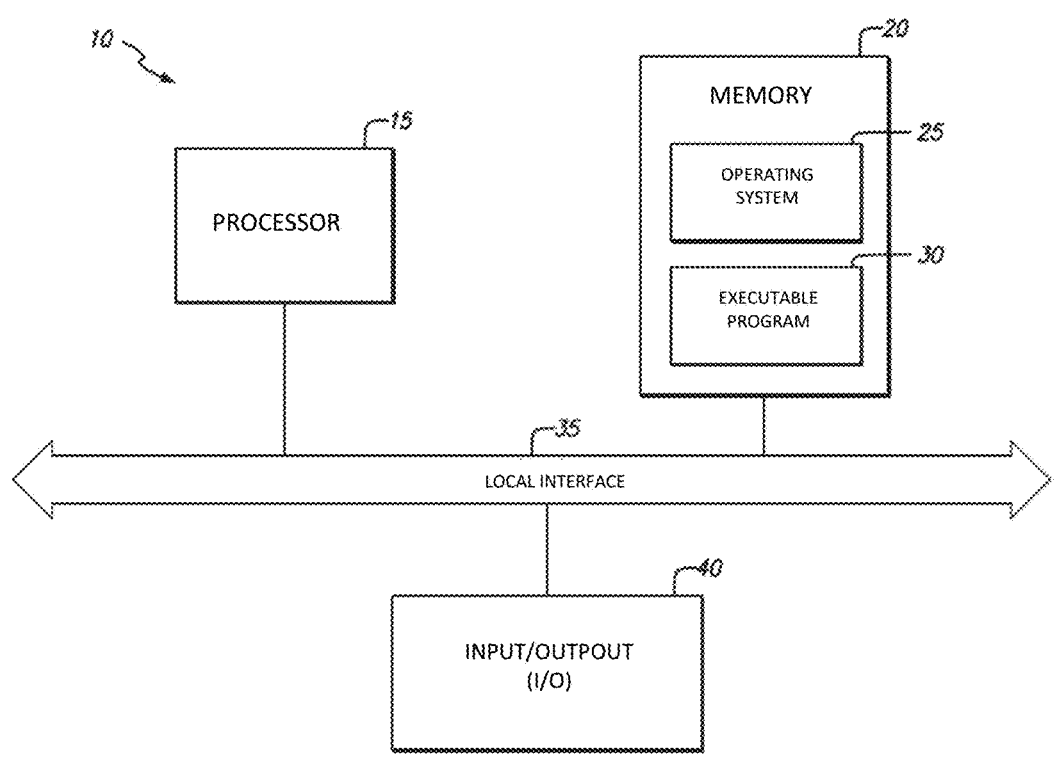
FIG. 8 illustrates example hardware for the method.

FIG. 8 is an exemplary embodiment of a target hardware (10) (e.g., a computer system) for implementing the embodiment of FIGS. 1 to 7, FIG. 9, FIG. 10, and FIG. 11. This target hardware comprises a processor (15), a memory bank (20), a local interface bus (35) and one or more Input/Output devices (40). The processor may execute one or more instructions related to the implementation of FIG. 1 to FIG. 7, FIG. 9, FIG. 10, and FIG. 11 and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 8. In some embodiments a plurality of processors may be used in a parallel configuration for added execution speed. In such a case, the executable program may be specifically tailored to a parallel execution. Also, in some embodiments the processor (15) may execute part of the implementation of FIG. 1 to 7, FIG. 9, FIG. 10, and FIG. 11 and some other part may be implemented using dedicated hardware/firmware placed at an Input/Output location accessible by the target hardware (10) via local interface (35). The target hardware (10) may include a plurality of executable programs (30), wherein each may run independently or in combination with one another.

Example Process

Figure 9:
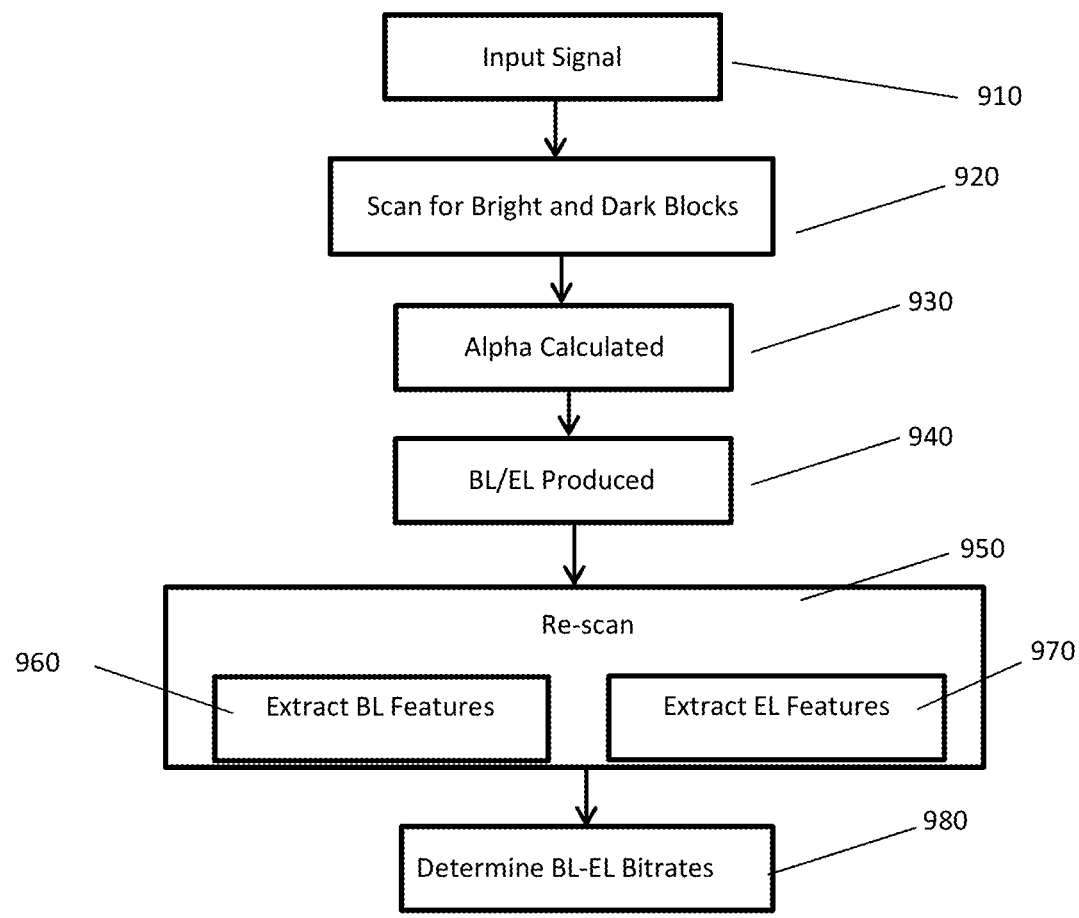
FIG. 9 illustrates an example method to assign BL and EL bitrate in a two pass approach.

FIG. 9 shows a flowchart of an example of the process of the two pass method. In the first pass, all frames within a scene of an input video (910) are scanned (920) to find bright and dark blocks. From this, an alpha value is calculated (930) for the forward reshaping of the luminance channel (e.g., the I channel). BL and EL can then be produced (940) by clipping a mid-range of the luminance channel at the lower bit depth. Then a second pass is made (950) where BL and EL pixels are analyzed separately (960, 970) for feature content. With the feature content known, the BL and EL bitrates can be determined (980) from a machine learned model/classifier.

Figure 10:
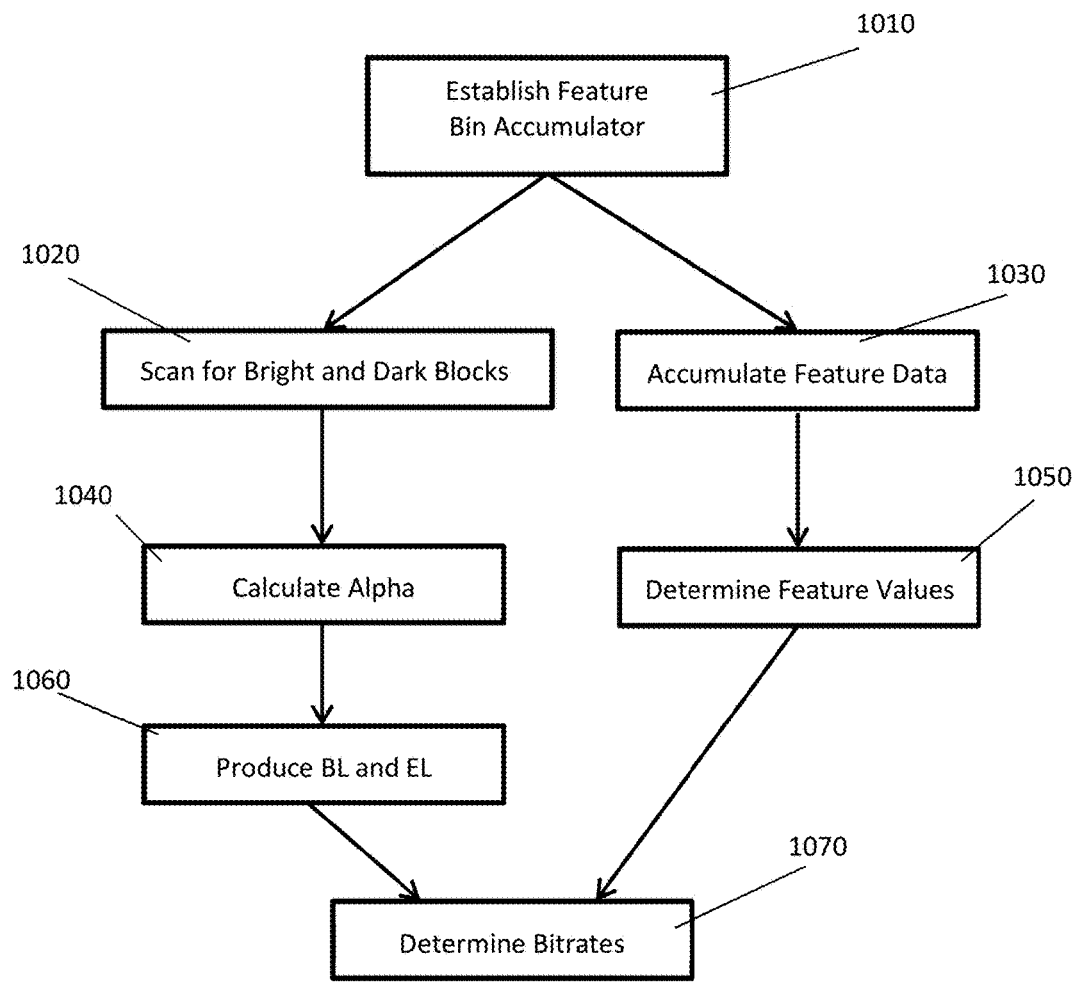
FIG. 10 illustrates an example to assign BL and EL bitrate in a one pass approach.

FIG. 10 shows a flowchart depicting an example process of the one pass feature bin method. Prior to scanning, a feature bin accumulator is established (1010) that has partitions in the luminance range. The frames within a scene are scanned (1020) for bright and dark blocks, while accumulating feature data (1030). For example, the feature data may be accumulated in the feature bin accumulator. When the scan is complete, the alpha is calculated (1040) from the bright and dark blocks and the feature values are determined (1050) from the feature data. For example, the feature values may be determined from values in the feature bin accumulator. In general, the feature values may be determined from the feature data. Now BL and EL can be produced (1060) by clipping at a separation value of luminance. For example, BL and EL can be produced by clipping at a mid-range of the forward reshaped luminance channel. In general, the separation value may be determined based on the calculated alpha, e.g., based on the forward reshaping function, in which the calculated alpha is the exponent. The BL and EL bitrates are determined (1070) from the features by being processed against the model/classifier. In other words, the features (e.g., feature values of the features) are processed against (e.g., compared to) a machine learning model. Finally, a BL bitstreams and an EL bitstream may be output at the BL and EL bitrates, respectively. The BL bitstream may be generated by compressing BL data (e.g., data of the BL) in accordance with the BL bitrate and the EL bitstream may be generated by compressing EL data (e.g., data of the EL) in accordance with the EL bitrate.

Figure 11:
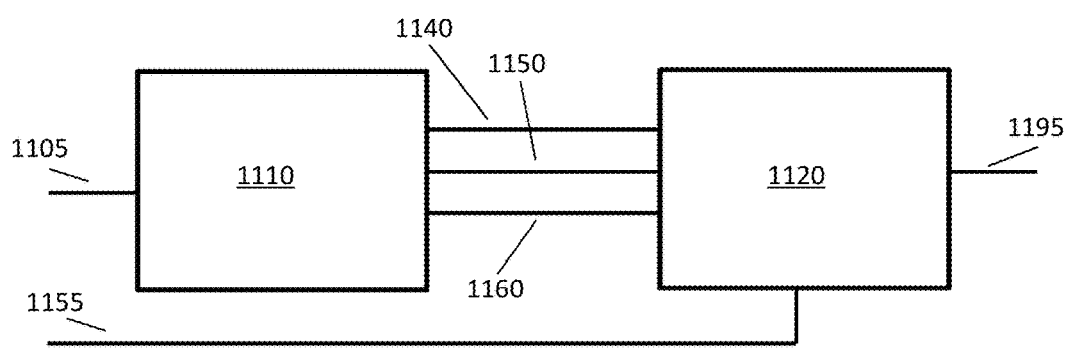
FIG. 11 illustrates an example encoder/decoder system for the method.

FIG. 11 shows an example encoder/decoder system for the method. A video input (1105) is encoded by the NBC encoder (1110). This can be, for example, a 16-bit EDR, where the encoder (1110) creates metadata (1140), and EL stream (1150), and a BL stream (1160) for transmission to the decoder (1120). The EL stream (1150) and BL stream (1160) bitrates are controlled by the encoder (1110) using a machine learning produced classification system. The decoder (1120) then uses the metadata (1140), EL stream (1150), and BL stream (1160) to produce an output video stream (1195). The content provider can also provide the decoder (1120) with additional metadata (1155) for use in decoding.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A method of assigning bitrates to base layers and enhancement layers in a dual codec, the method comprising:
    scanning a scene of a video for bright and dark areas and accumulating feature data of the scene, and determining feature values of one or more features of the scene using the accumulated feature data of the scene;

calculating an alpha value based on the bright and dark areas, wherein the alpha value is the exponent of a formula for forward reshaping of a luminance channel of the video;

decomposing the scene into a base layer and at least one enhancement layer, wherein said decomposing involves determining the base layer and the at least one enhancement layer of the video based on the alpha value;

determining a bitrate class of the base layer and the at least one enhancement layer by processing the feature values of the one or more features of the scene against a machine learning model; and setting the bitrates of the base layer and the at least one enhancement layer based on the determined bitrate class, wherein processing of the feature values of the one or more features against the machine learning model comprises:

mapping the feature values of the one or more features into N dimensional space where N is the number of the one or more features; and determining where the mapped feature values is located in the N dimensional space compared to predetermined hyperplanes of the N dimensional space.

2. The method of claim 1, wherein determining the base layer and the at least one enhancement layer of the video is performed by clipping at a mid-range of the forward reshaped luminance channel.

3. The method of claim 1, wherein the formula for forward reshaping $s_i$ is of the form $$s_i = \text{round}\left((C_H - C_L)\left(\frac{v_i - v_L}{v_H - v_L}\right)^\alpha + C_L\right)$$

where $\alpha$ is the alpha value, $v_L$ and $v_H$ are minimum and maximum luminance values in an individual shot of the scene of the video, and $C_L$ and $C_H$ are minimum and maximum values of a reshaped output signal.

4. The method of claim 1, wherein the one or more features are selected from the list of: ratio of enhancement layer pixels of an enhancement layer to base layer pixels, ratio of enhancement layer pixels of an enhancement layer to total pixels, ratio of standard deviation in one of the at least one enhancement layer to a channel standard deviation in the base layer for a channel, the alpha value, and salient region detection.

5. The method of claim 4, where the video is in IPT color space and the channel is any of I channel, P channel, or T channel.

6. The method of claim 5, wherein the one or more features comprises a ratio of standard deviation in the one of the at least one enhancement layer to a channel standard deviation in the base layer for the I channel and a ratio of standard deviation in the one of the at least one enhancement layer to a channel standard deviation in the base layer for the T channel.

7. The method of claim 4, wherein the salient regions comprise images of fire, images of faces, or both images of fire and images of faces.

8. The method of claim 1, wherein the calculating the alpha value is a value in the range of 1.0 to 1.7.

9. The method of claim 1, wherein the accumulating of feature data comprises accumulating the feature values into a plurality of bins, and optionally, wherein each bin of the plurality of bins corresponds to a range of luminance values.

10. The method of claim 1, wherein the feature values comprise a ratio of standard deviation in one of the at least one enhancement layer to a channel standard deviation in the base layer, and optionally wherein the standard deviations of each bin of the plurality of bins are multiplied by a power function.

* * * * *